United States Patent
Kamikawa et al.

(10) Patent No.: US 11,897,360 B2
(45) Date of Patent: Feb. 13, 2024

(54) INFORMATION PROCESSING DEVICE, INFORMATION PROCESSING METHOD, AND PROGRAM

(71) Applicant: SONY CORPORATION, Tokyo (JP)

(72) Inventors: Yasuhisa Kamikawa, Tokyo (JP); Aneesh Chand, Tokyo (JP); Wataru Kokubo, Tokyo (JP); Kazuo Hongo, Chiba (JP)

(73) Assignee: SONY CORPORATION, Tokyo (JP)

(*) Notice: Subject to any disclaimer, the term of this patent is extended or adjusted under 35 U.S.C. 154(b) by 755 days.

(21) Appl. No.: 16/976,862

(22) PCT Filed: Dec. 11, 2018

(86) PCT No.: PCT/JP2018/045445
§ 371 (c)(1),
(2) Date: Aug. 31, 2020

(87) PCT Pub. No.: WO2019/171693
PCT Pub. Date: Sep. 12, 2019

(65) Prior Publication Data
US 2020/0406781 A1    Dec. 31, 2020

(30) Foreign Application Priority Data
Mar. 8, 2018 (JP) .................... 2018-042315

(51) Int. Cl.
*B60L 53/80* (2019.01)
*B60L 50/60* (2019.01)
(Continued)

(52) U.S. Cl.
CPC ............... *B60L 53/80* (2019.02); *B60L 50/66* (2019.02); *B60L 53/36* (2019.02); *G05D 1/0088* (2013.01); *H02J 7/0048* (2020.01); *A63H 11/20* (2013.01)

(58) Field of Classification Search
CPC .......... B60L 53/80; B60L 50/66; B60L 53/36; G05D 1/0088; H02J 7/0048; H02J 7/0045;
(Continued)

(56) References Cited

U.S. PATENT DOCUMENTS

2017/0100837 A1    4/2017 Zevenbergen et al.
2017/0364075 A1    12/2017 Hirata et al.
(Continued)

FOREIGN PATENT DOCUMENTS

CN    108136580 A    6/2018
CN    108290631 A    7/2018
(Continued)

OTHER PUBLICATIONS

International Search Report and Written Opinion of PCT Application No. PCT/JP2018/045445, dated Feb. 5, 2019, 09 pages of ISRWO.

*Primary Examiner* — Paul Dinh
(74) *Attorney, Agent, or Firm* — CHIP LAW GROUP

(57) ABSTRACT

An information processing device, an information processing method, and a program are proposed that make it possible to allow an autonomous moving body to make battery replacement more easily. The information processing device includes a controller. The controller couples, in a first region, a connection terminal to the autonomous moving body. The first region is provided for ejection of a first battery included in the autonomous moving body. The connection terminal is provided for power supply and included in a power supply apparatus disposed in the first region. The controller moves the autonomous moving body with the connection terminal coupled, from the first region to a second region in which a charged second battery is disposed.

19 Claims, 11 Drawing Sheets

(51) Int. Cl.
  *B60L 53/36* (2019.01)
  *H02J 7/00* (2006.01)
  *G05D 1/00* (2006.01)
  *A63H 11/20* (2006.01)

(58) Field of Classification Search
  CPC ......... A63H 11/20; Y02T 10/70; Y02T 90/12; Y02T 10/7072; Y02T 90/14; B62D 57/032; B25J 5/00; B25J 13/00
  USPC .......................................................... 320/107
  See application file for complete search history.

(56) References Cited

U.S. PATENT DOCUMENTS

| | | | |
|---|---|---|---|
| 2017/0368684 A1 | 12/2017 | Zevenbergen et al. | |
| 2018/0104829 A1* | 4/2018 | Altman | B60L 53/80 |
| 2018/0265222 A1 | 9/2018 | Takagi | |
| 2020/0242544 A1* | 7/2020 | Galluzzo | G05D 1/0088 |

FOREIGN PATENT DOCUMENTS

| | | | |
|---|---|---|---|
| JP | 60-213490 A | 10/1985 | |
| JP | 2001-147718 A | 5/2001 | |
| JP | 2006-116641 A | 5/2006 | |
| JP | 2012-043072 A | 3/2012 | |
| JP | 2014-230409 A | 12/2014 | |
| JP | 2016-145032 A | 8/2016 | |
| JP | 2017-105242 A | 6/2017 | |
| WO | 2016/125728 A1 | 8/2016 | |
| WO | 2017/030188 A1 | 2/2017 | |
| WO | 2017/062259 A1 | 4/2017 | |
| WO | 2017/099058 A1 | 6/2017 | |

* cited by examiner

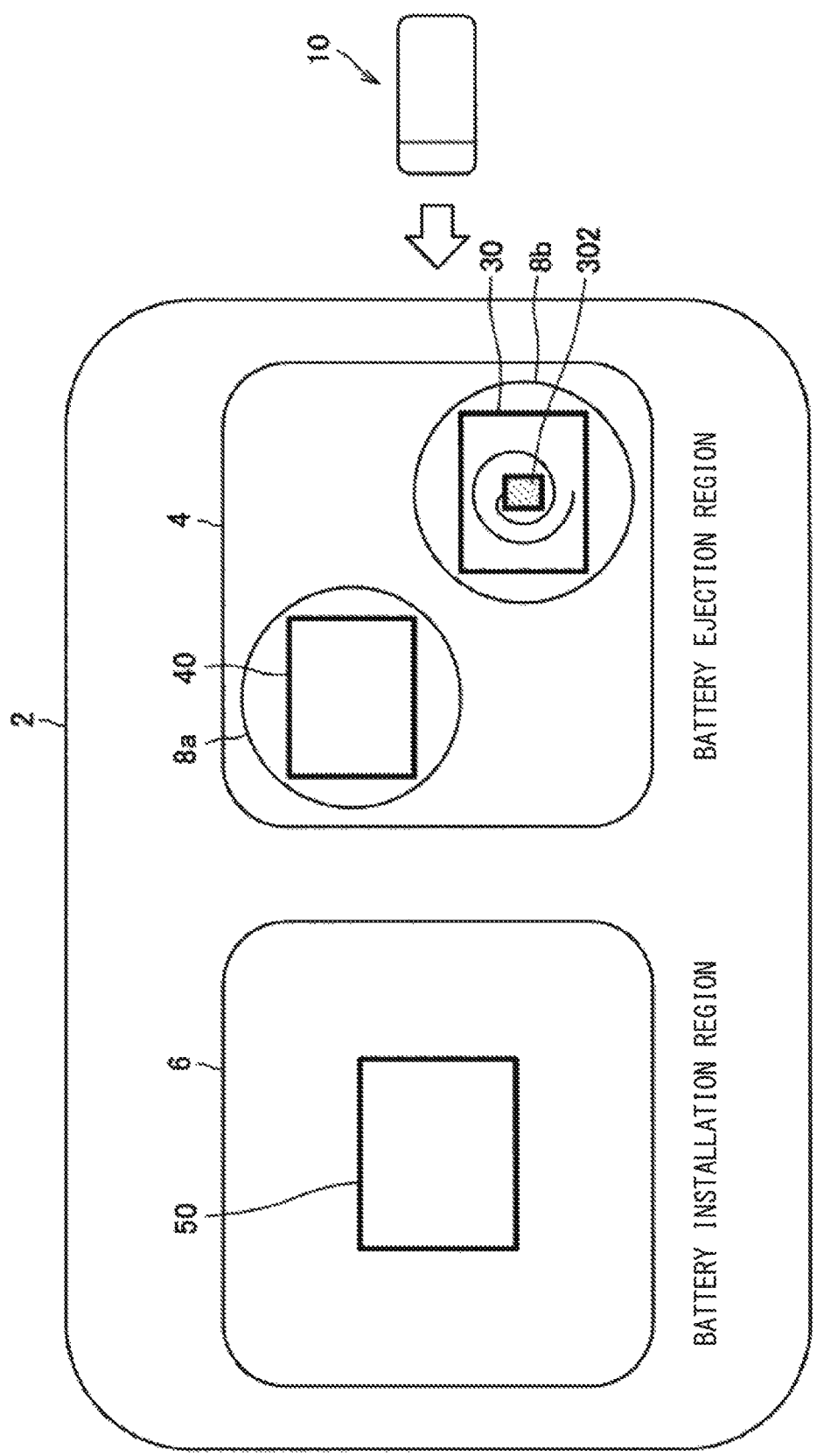
[FIG. 1]

[FIG. 2]
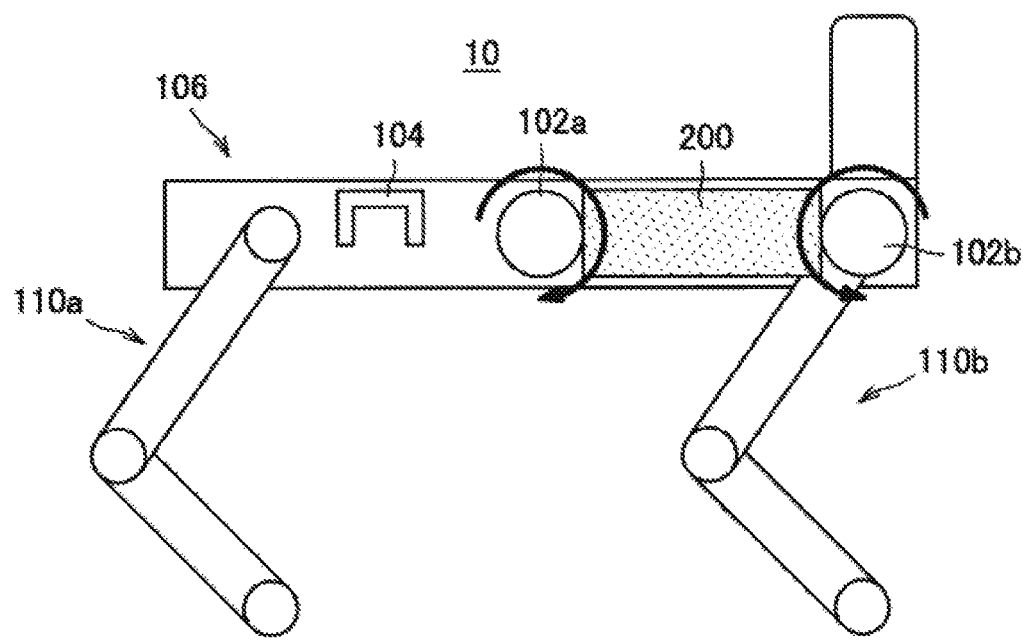
[FIG. 3]
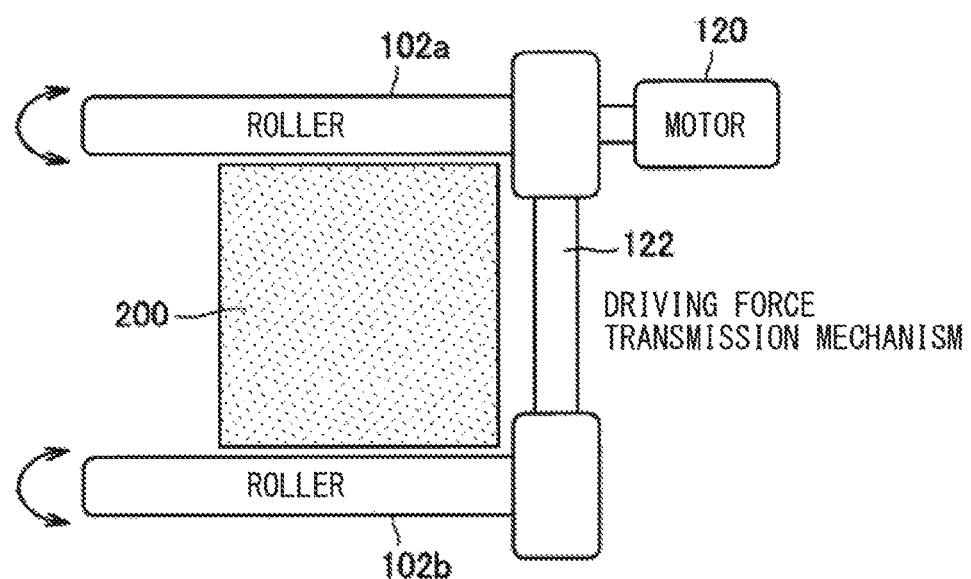

[FIG. 4]
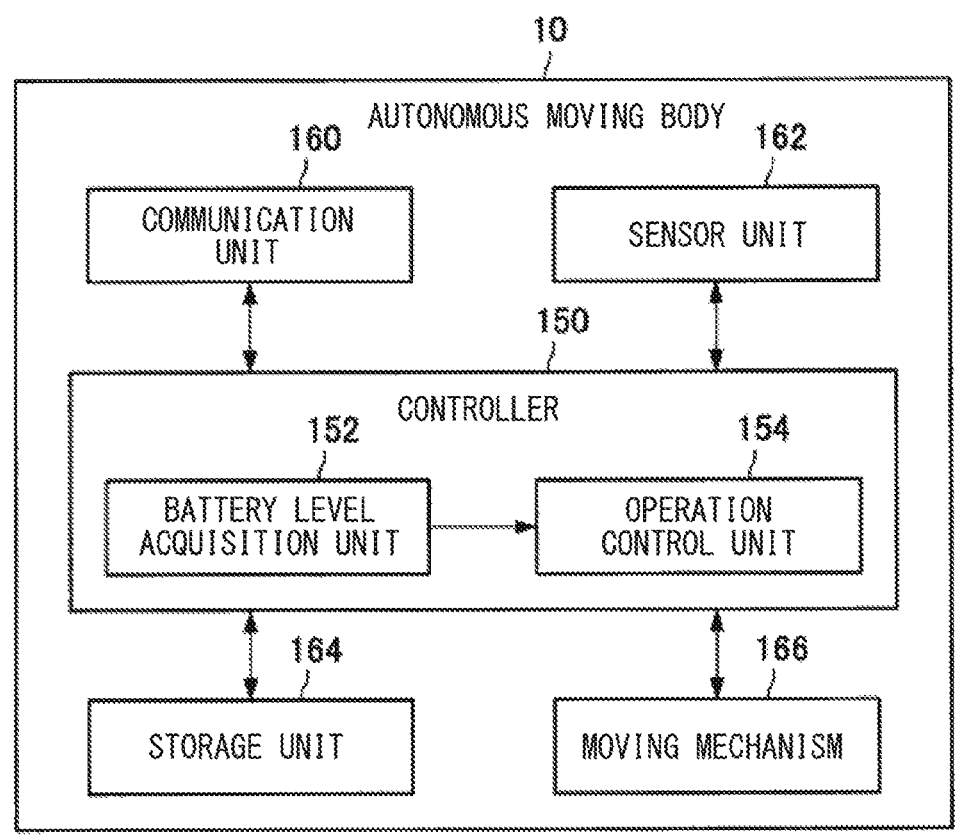

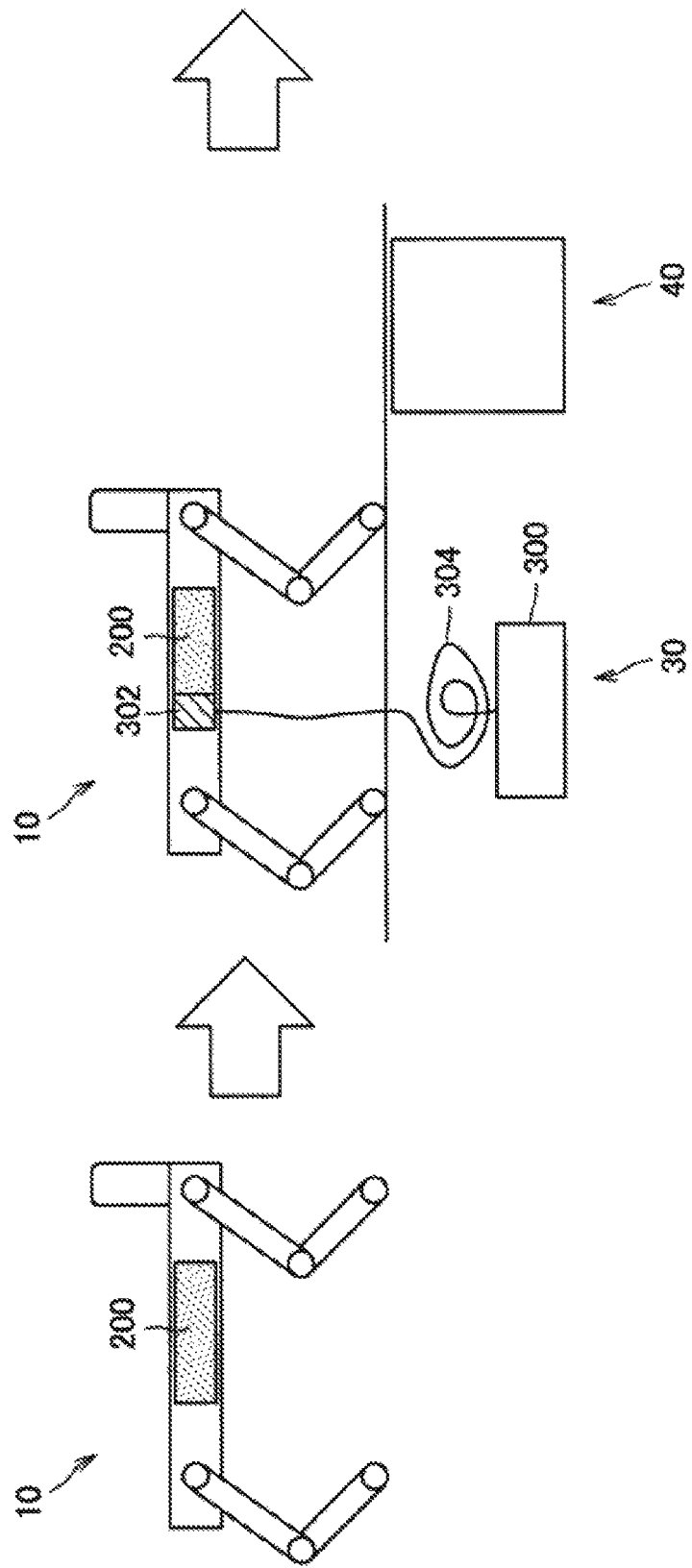

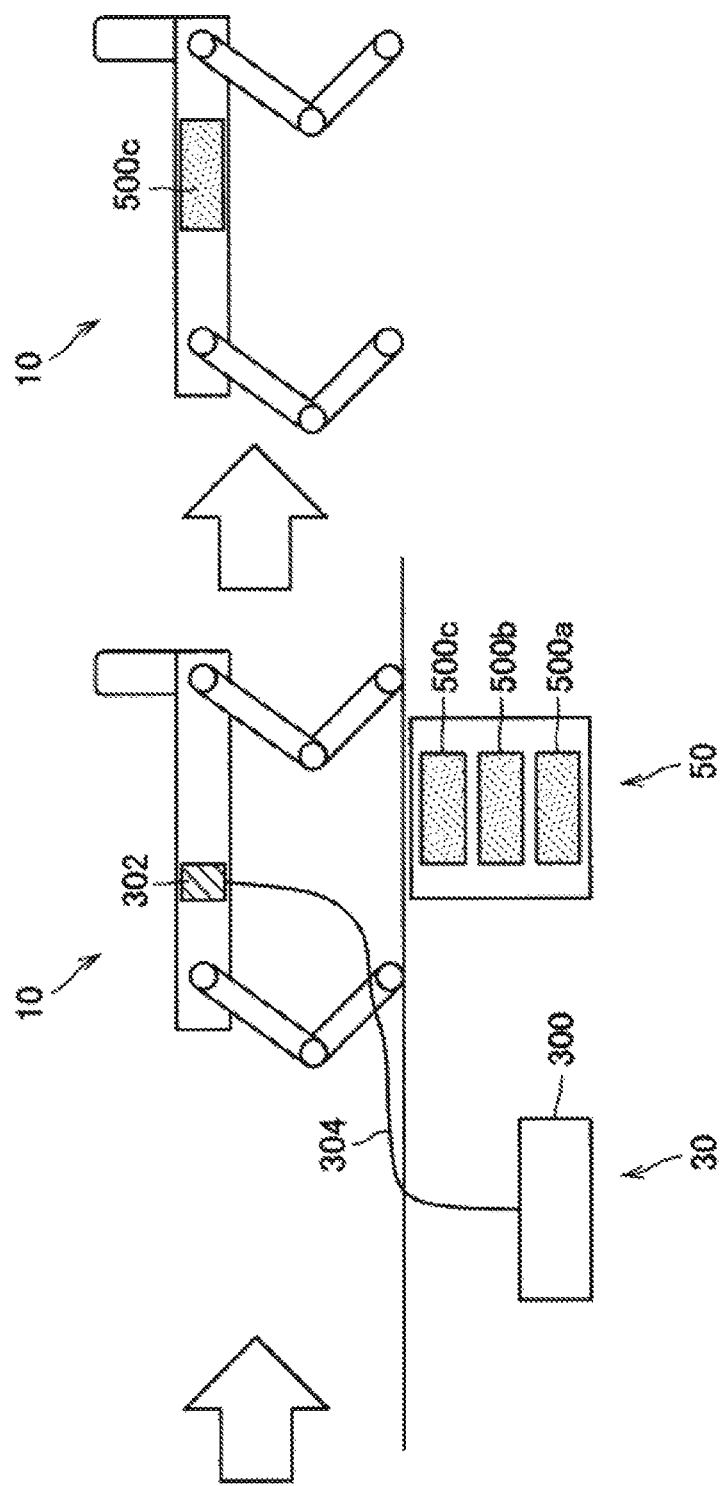

[FIG. 7]
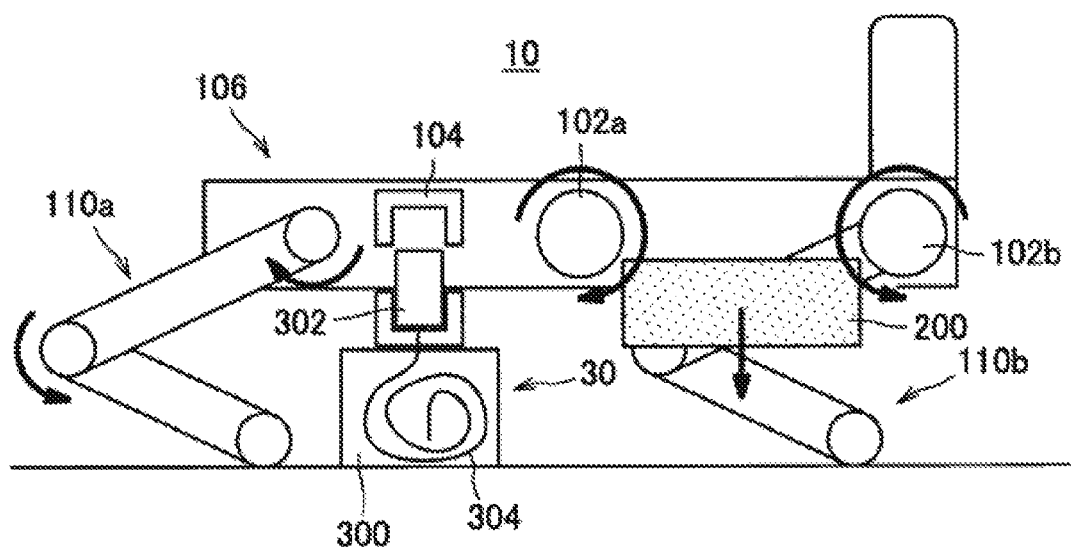

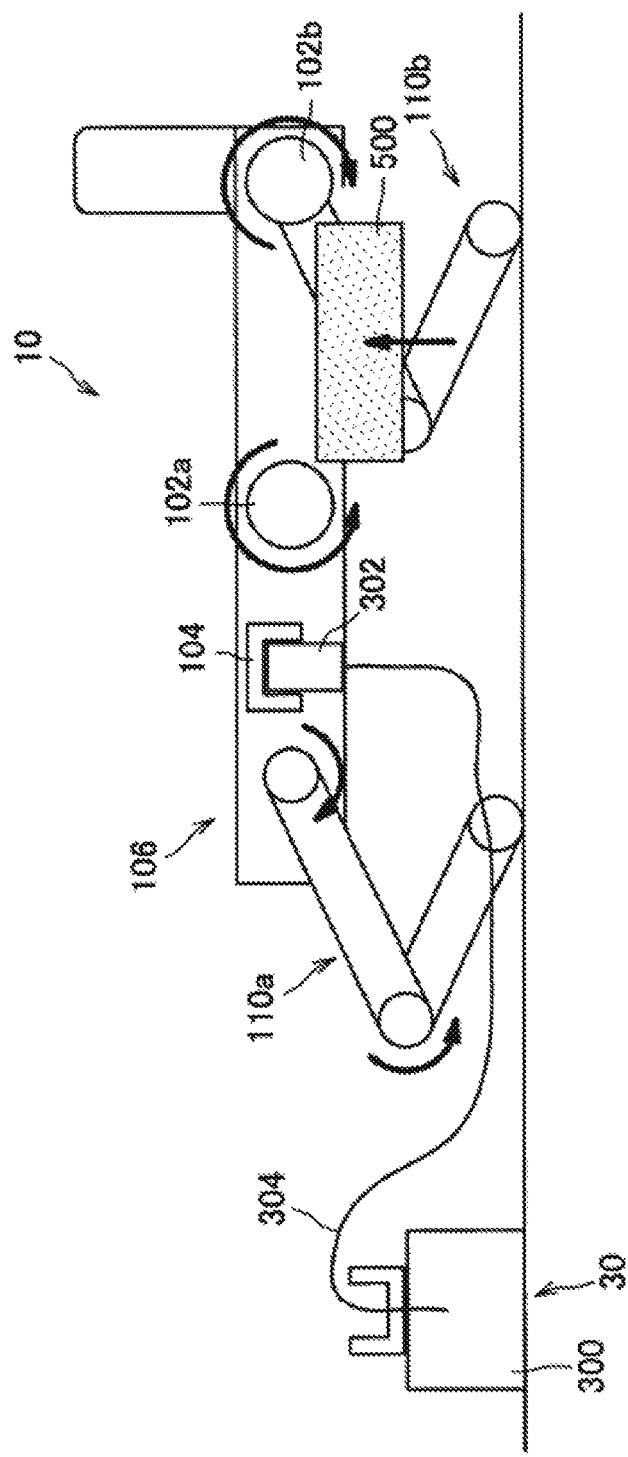
[FIG. 8]

[FIG. 9]
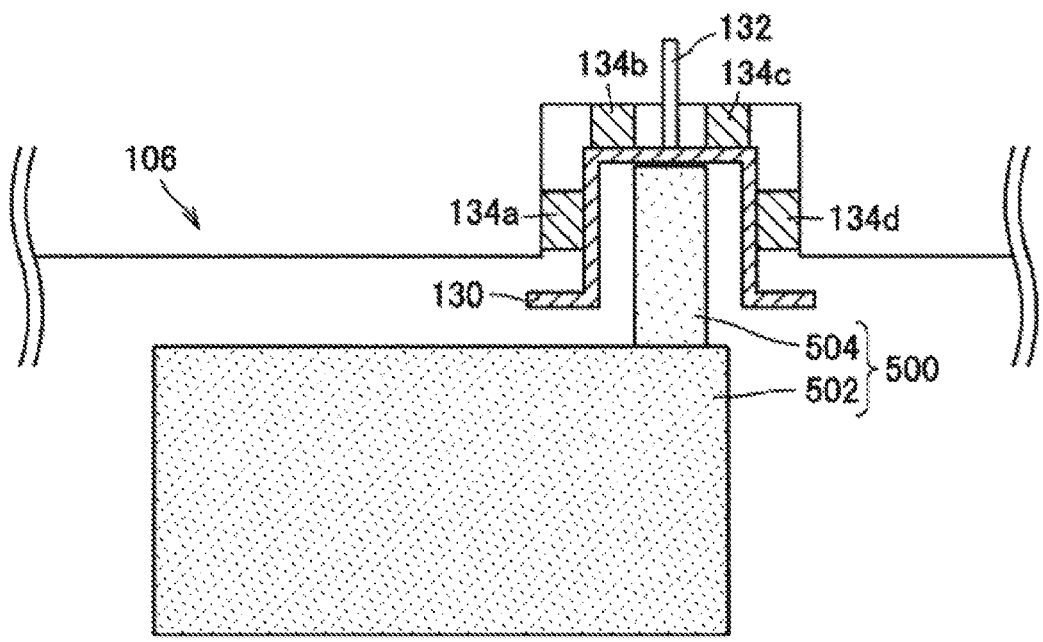
[FIG. 10]
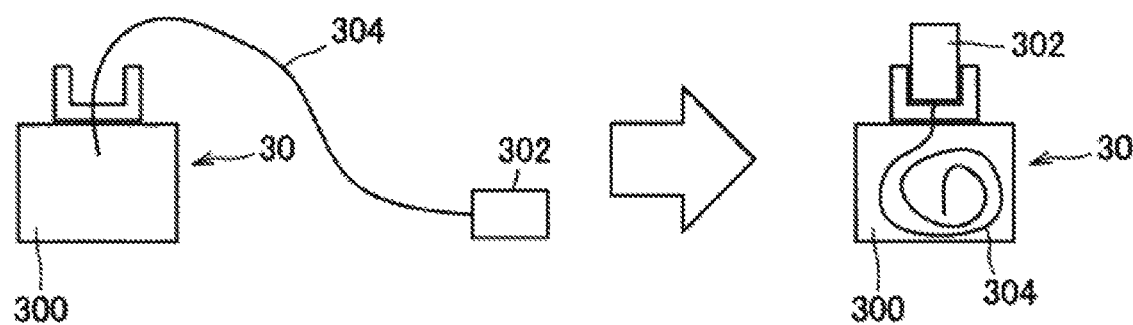

[FIG. 11]
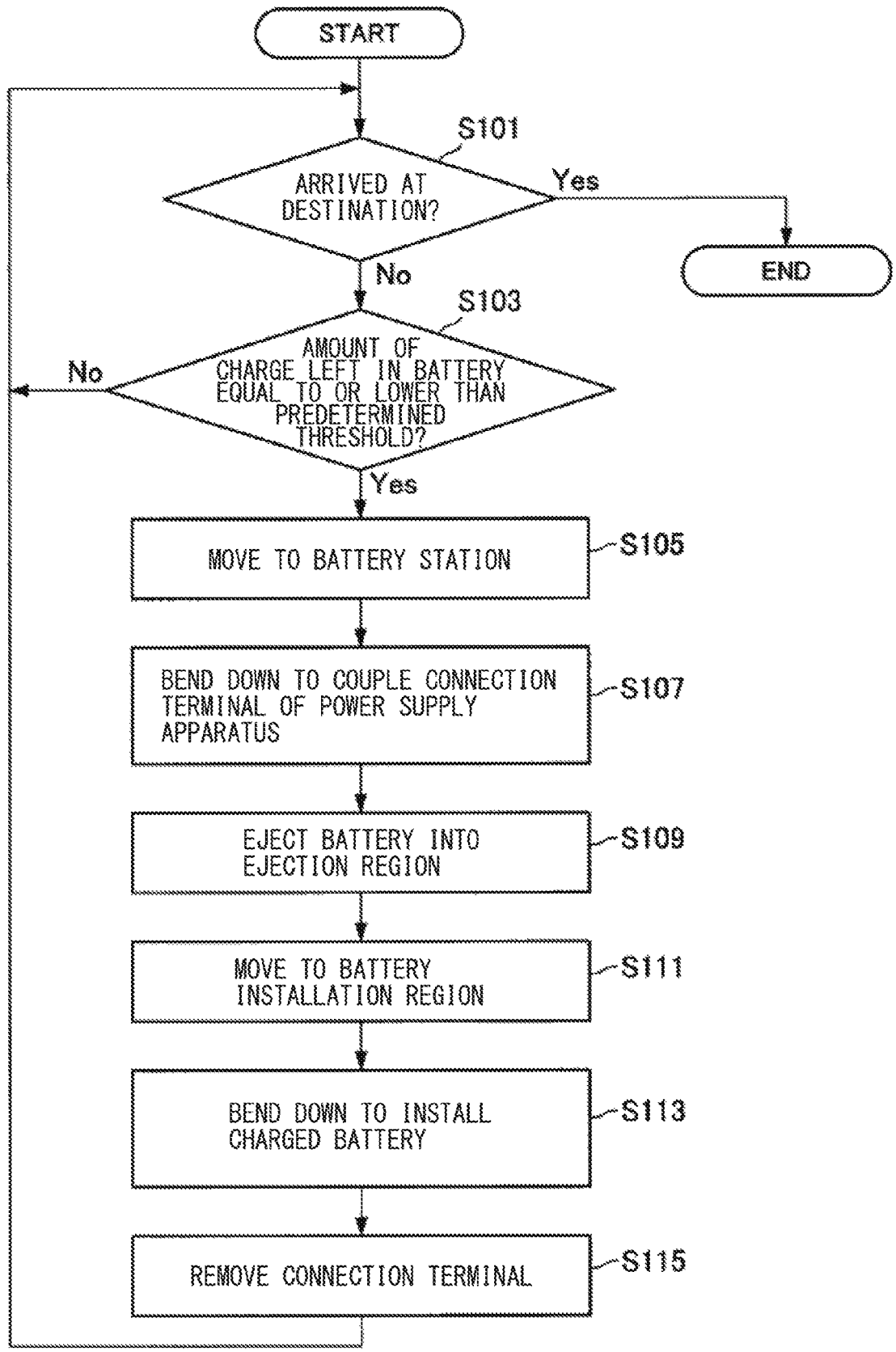

[FIG. 12]
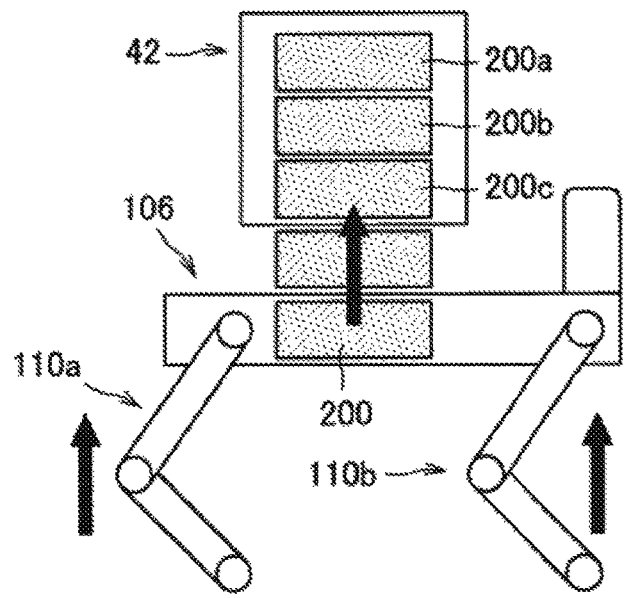
[FIG. 13]
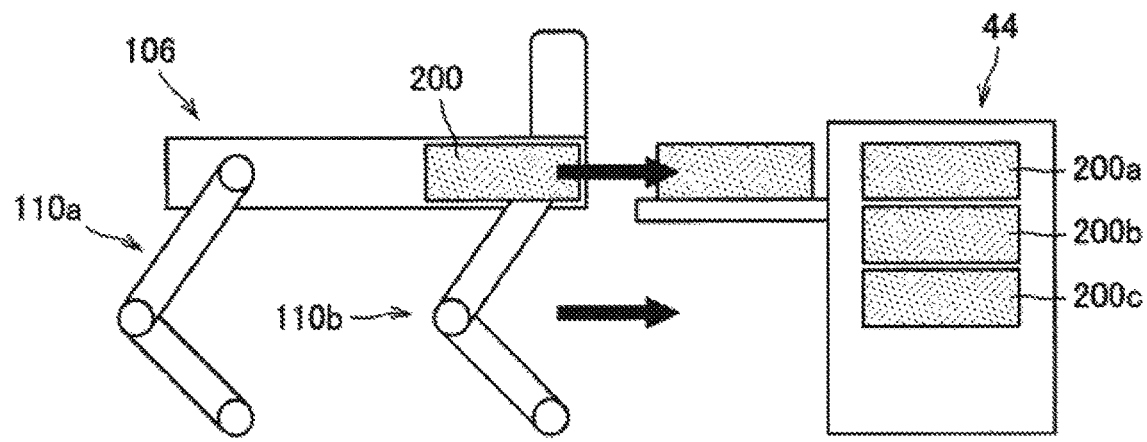
[FIG. 14]
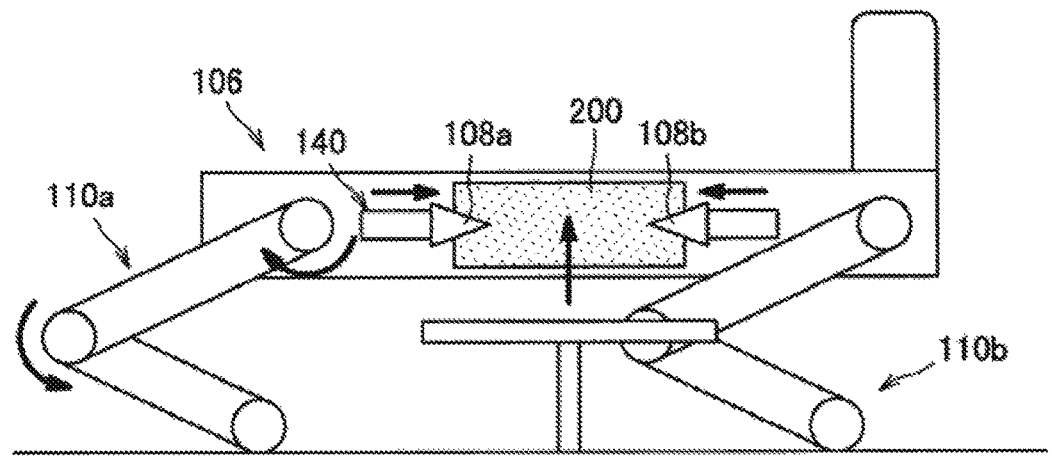

[FIG. 15]
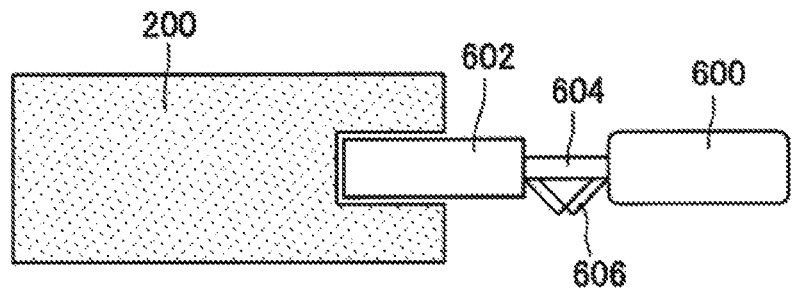
[FIG. 16]
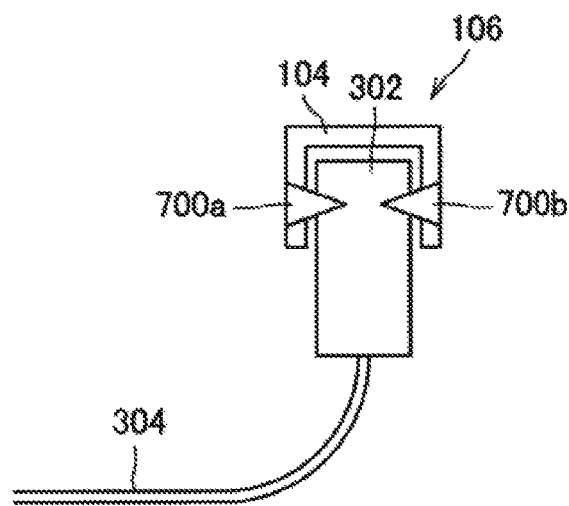
[FIG. 17]
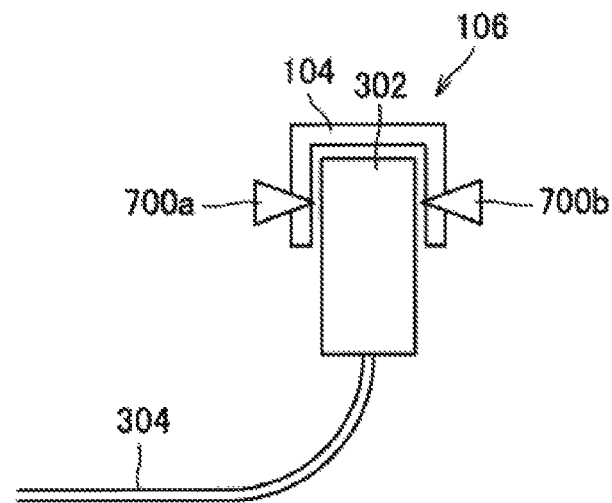

INFORMATION PROCESSING DEVICE, INFORMATION PROCESSING METHOD, AND PROGRAM

CROSS REFERENCE TO RELATED APPLICATIONS

This application is a U.S. National Phase of International Patent Application No. PCT/JP2018/045445 filed on Dec. 11, 2018, which claims priority benefit of Japanese Patent Application No. JP 2018-042315 filed in the Japan Patent Office on Mar. 8, 2018. Each of the above-referenced applications is hereby incorporated herein by reference in its entirety.

TECHNICAL FIELD

The present disclosure relates to an information processing device, an information processing method, and a program.

BACKGROUND ART

In recent years, various machines (e.g., vehicles and robots) have been proposed that autonomously perform operations by, for example, recognizing situations of external environment. Moreover, various methods have been proposed with respect to charging of batteries to be used for autonomous moving bodies.

For example, the following PTL 1 describes a robot on the occasion of battery replacement. The robot accommodates a new battery in an accommodation unit that accommodates no battery. Thereafter, the robot takes out a battery having small remaining capacity.

CITATION LIST

Patent Literature

PTL 1: Japanese Unexamined Patent Application Publication No. 2006-116641

SUMMARY OF THE INVENTION

Problem to be Solved by the Invention

However, battery replacement is not easy by the technique described in PTL 1. For example, in the technique described in PTL 1, for battery replacement, the robot must accommodate the new battery, with the battery having the small remaining capacity kept accommodated.

Thus, the present disclosure proposes a new and improved information processing device, an information processing method, and a program that make it possible to allow an autonomous moving body to make battery replacement more easily.

Means for Solving the Problem

According to the present disclosure, an information processing device is provided. The information processing device includes a controller. The controller couples, in a first region, a connection terminal to an autonomous moving body. The first region is provided for ejection of a first battery included in the autonomous moving body. The connection terminal is provided for power supply and included in a power supply apparatus disposed in the first region. The controller moves the autonomous moving body with the connection terminal coupled, from the first region to a second region in which a charged second battery is disposed.

Moreover, according to the present disclosure, an information processing method is provided. The information processing method includes: coupling, in a first region, a connection terminal to an autonomous moving body, the first region being provided for ejection of a first battery included in the autonomous moving body, and the connection terminal being provided for power supply and included in a power supply apparatus disposed in the first region; and allowing a processor to move the autonomous moving body with the connection terminal coupled, from the first region to a second region in which a charged second battery is disposed.

Furthermore, according to the present disclosure, a program is provided. The program causes a computer to implement a controller that: couples, in a first region, a connection terminal to an autonomous moving body, the first region being provided for ejection of a first battery included in the autonomous moving body, and the connection terminal being provided for power supply and included in a power supply apparatus disposed in the first region; and moves the autonomous moving body with the connection terminal coupled, from the first region to a second region in which a charged second battery is disposed.

Effect of the Invention

As described above, according to the present disclosure, it is possible to allow the autonomous moving body to make battery replacement more easily. It is to be noted that the effects described here are not necessarily limitative, and may be any of effects described in the present disclosure.

BRIEF DESCRIPTION OF DRAWINGS

FIG. 1 is a diagram that schematically illustrates a configuration of a battery station 2 according to an embodiment of the present disclosure.

FIG. 2 is a diagram that schematically illustrates an example of a physical configuration of an autonomous moving body 10 according to the embodiment, as the autonomous moving body 10 is viewed from the right.

FIG. 3 is a diagram that schematically illustrates an example of an external appearance as viewed from above, of a plurality of rollers 102 for battery attachment and detachment according to the embodiment.

FIG. 4 is a block diagram illustrating an example of a functional configuration of the autonomous moving body 10 according to the embodiment.

FIG. 5 is a diagram that schematically illustrates part of a flow of movement of the autonomous moving body 10 on the occasion of battery replacement according to the embodiment.

FIG. 6 is a diagram that schematically illustrates part of the flow of the movement of the autonomous moving body 10 on the occasion of the battery replacement according to the embodiment.

FIG. 7 is a diagram illustrating an example of a "control to couple a connection terminal 302", and a "control to eject a battery 200", according to the embodiment.

FIG. 8 is a diagram illustrating an example of a "control to install a charged battery 500" according to the embodiment.

FIG. 9 is a diagram illustrating an installation example of the charged battery 500 in a main body 106 of the autonomous moving body 10 according to the embodiment.

FIG. 10 is a diagram illustrating an example where the connection terminal 302 is retracted toward a power supply apparatus 30 on the occasion of removal of the connection terminal 302 from the autonomous moving body 10.

FIG. 11 is a flowchart illustrating an example of a flow of processing according to the embodiment.

FIG. 12 is a diagram illustrating an ejection example of the battery 200 according to Application Example 1 of the embodiment.

FIG. 13 is a diagram illustrating the ejection example of the battery 200 according to Application Example 1 of the embodiment.

FIG. 14 is a diagram that schematically illustrates a configuration example of a linear pin mechanism 140 according to Application Example 2 of the embodiment.

FIG. 15 is a diagram that schematically illustrates a configuration example of a driving mechanism provided for insertion of a connector 602 into the battery 200, according to Application Example 3 of the embodiment.

FIG. 16 is a diagram illustrating an example of a fixed state of the connection terminal 302 according to Application Example 4 of the embodiment.

FIG. 17 is a diagram illustrating an example of an open state of the connection terminal 302 according to Application Example 4 of the embodiment.

MODES FOR CARRYING OUT THE INVENTION

In the following, preferred embodiments of the present disclosure are described in detail with reference to the attached drawings. It is to be noted that in the present specification and the drawings, constituent elements having substantially the same functional configuration are denoted by the same reference sign to omit redundant description.

Moreover, in the present specification and the drawings, there are also cases where a plurality of the constituent elements having substantially the same functional configuration is denoted and distinguished by the same reference sign followed by different alphabet characters. For example, the plurality of the constituent elements having the same functional configuration is distinguished, on the as-needed basis, as in an autonomous moving body 10a and an autonomous moving body 10b. However, in a case where it is unnecessary to particularly distinguish each of the plurality of the constituent elements having the same functional configuration, solely the same reference sign is given. For example, in a case where it is unnecessary to particularly distinguish the autonomous moving body 10a and the autonomous moving body 10b, they are referred to simply as the autonomous moving body 10.

Furthermore, description of the "modes for carrying out the invention" is given in the following order of items.
1. Summary
2. Detailed Description of Embodiments
3. Application Examples
4. Modification Examples

1. SUMMARY

The present disclosure may be implemented in various modes, as described in detail in, for example, "2. Detailed Description of Embodiments". First, with reference to FIG. 1, description is given of summary of embodiments related to the present disclosure.

As illustrated in FIG. 1, in the present embodiment, the autonomous moving body 10 is assumed to move mainly autonomously in a real space. Moreover, as illustrated in FIG. 1, it is assumed that one or more battery stations 2 are provided in the real space.

1-1. Autonomous Moving Body 10

The autonomous moving body 10 is an example of an information processing device according to the present disclosure. The autonomous moving body 10 may be a device (machine) autonomously movable with the use of an electric and/or magnetic action. For example, as illustrated in FIG. 2, the autonomous moving body 10 may be a robot (such as a humanoid robot, a pet robot, an autonomous car, or a drone) that is configured to autonomously move (for example, walk). However, the present embodiment is not limited to such examples, and the autonomous moving body 10 may be other kinds of devices, e.g., conveyances (such as vehicles, vessels, and aircrafts), various industrial machines, or toys.

In the autonomous moving body 10, a battery 200 may be attachable to and detachable from inside the autonomous moving body 10. Thus, the autonomous moving body 10 performs various operations (such as movements) with the use of electric power supplied from the battery 200.

1-2. Battery Station 2

The battery station 2 is a region provided for battery replacement of the autonomous moving body 10. The battery station 2 includes a battery ejection region 4 and a battery installation region 6. The battery ejection region 4 is provided for ejection of the battery 200 in short of an amount of charge left. In the battery installation region 6, one or more charged batteries 500 are disposed. Here, the battery ejection region 4 is an example of a first region according to the present disclosure. Moreover, the battery installation region 6 is an example of a second region according to the present disclosure.

In the battery ejection region 4, a power supply apparatus 30 described later is disposed. For example, as illustrated in FIG. 1, the battery ejection region 4 may be divided into a sub-region 8b for battery ejection and a sub-region 8a for power supply connection. The sub-region 8b for battery ejection is provided for the ejection of the battery 200. The sub-region 8a for power supply connection is a region that is located outside the sub-region 8b for battery ejection, and in which the power supply apparatus 30 is disposed. Here, the sub-region 8b for battery ejection is an example of a first sub-region according to the present disclosure. Moreover, the sub-region 8a for power supply connection is an example of a second sub-region according to the present disclosure.

The present embodiment is, however, not limited to such examples. In the battery ejection region 4, a region for the ejection of the battery 200 and a region where the power supply apparatus 30 is disposed do not have to be particularly separated.

1-3. Power Supply Apparatus 30

As illustrated in FIG. 5, the power supply apparatus 30 may include, for example, a main body 300, a connection terminal 302, and a cable 304. The connection terminal 302 is provided for electric power supply. The cable 304 links the main body 300 and the connection terminal 302. Although details are described later, in a case where the connection terminal 302 is coupled to the autonomous moving body 10, the power supply apparatus 30 is able to supply electric power to the autonomous moving body 10 through the connection terminal 302.

1-4. Summary of Issues

In the forgoing, the present embodiment is described in outline. Meanwhile, in well-known battery charging systems, charging takes long time. Moreover, it is usually impossible to drive a moving body during the charging. For these reasons, well-known battery charging systems have an issue of lack of efficiency.

Accordingly, focusing on the forgoing situations as one of viewpoints has led to creation of the autonomous moving body 10 according to the present embodiment. In the autonomous moving body 10, the connection terminal 302 is coupled to the autonomous moving body 10 in the battery ejection region 4. The connection terminal 302 is included in the power supply apparatus 30 disposed in the battery ejection region 4. Moreover, the autonomous moving body 10 moves from the battery ejection region 4 to the battery installation region 6 with the connection terminal 302 coupled. Hence, it is possible to make battery replacement easily and efficiently. In the following, detailed description of contents of the present embodiment is given in order.

2. DETAILED DESCRIPTION OF EMBODIMENTS

2-1. Physical Configuration

First, description is given of a physical configuration of the autonomous moving body 10 according to the present embodiment. FIG. 2 is a diagram that schematically illustrates an example of the physical configuration of the autonomous moving body 10, as the autonomous moving body 10 is viewed from the right. As illustrated in FIG. 2, the autonomous moving body 10 includes a main body 106 (in the following, sometimes also referred to as a body 106) and a plurality of legs 110. Moreover, in the main body 106, a plurality of rollers 102 for battery attachment and detachment, a female connector 104 for power supply, and a controller 150 described later (illustration omitted) are disposed.

Although details are described later, the plurality of the legs 110 is able to operate in accordance with a control by the controller 150. Thus, the autonomous moving body 10 is able to move toward a destination. It is to be noted that FIG. 2 illustrates an example where the number of the plurality of the legs 110 is "4", but such an example is non-limiting. The number may be any number equal to or greater than "2".

Moreover, the plurality of the rollers 102 for battery attachment and detachment is able to rotate in accordance with the control by the controller 150, for battery attachment and detachment. FIG. 3 is a diagram that schematically illustrates an example of an external appearance as viewed from above, of the plurality of the rollers 102 for battery attachment and detachment. As illustrated in FIG. 3, for example, a motor 120 and a roller 102a for battery attachment and detachment are linked. The motor 120 is disposed in the main body 106. Moreover, a driving force transmission mechanism 122 may be disposed between the roller 102a for battery attachment and detachment, and another roller 102b for battery attachment and detachment. The driving force transmission mechanism 122 is provided for transmission of a driving force of the motor 120. In this case, in the sub-region 8b for battery ejection, the controller 150 controls driving of the motor 120, and thereby is able to rotate the plurality of the rollers 102 for battery attachment and detachment. In this way, friction between the battery 200 and the plurality of the rollers 102 for battery attachment and detachment makes it possible to eject the battery 200 into outside the autonomous moving body 10. Furthermore, in the battery installation region 6, the controller 150 rotates the plurality of the rollers 102 for battery attachment and detachment, causing the charged battery 500 to be drawn up to inside the autonomous moving body 10 and installed in the main body 106. The charged battery 500 is disposed outside the autonomous moving body 10.

Moreover, the female connector 104 for power supply is a terminal (connector) that is able to be coupled to the connection terminal 302 of the power supply apparatus 30. Coupling the female connector 104 for power supply and the connection terminal 302 makes it possible to supply electric power to the autonomous moving body 10 from the power supply apparatus 30.

2-1-1. Modification Example

The physical configuration of the autonomous moving body 10 according to the present embodiment is not limited to the forgoing example. For example, as a mechanism for movements, the autonomous moving body 10 may include a plurality of wheels or a continuous track mechanism such as caterpillar (registered trademark), instead of the plurality of the legs 110.

2-2. Functional Configuration

In the forgoing, the physical configuration of the autonomous moving body 10 is described. Next, a functional configuration of the autonomous moving body 10 is described with reference to FIG. 4. FIG. 4 is a block diagram illustrating an example of the functional configuration of the autonomous moving body 10. As illustrated in FIG. 4, the autonomous moving body 10 includes the controller 150, a communication unit 160, a sensor unit 162, a storage unit 164, and a moving mechanism 166.

2-2-1. Controller 150

The controller 150 may be configured to include a processor circuit such as a CPU (Central Processing Unit) and a GPU (Graphics Processing Unit). Furthermore, the controller 150 may be configured to include a memory such as a ROM (Read Only Memory) and a RAM (Random Access Memory). The controller 150 may synthetically control operation of the autonomous moving body 10.

Moreover, as illustrated in FIG. 4, the controller 150 includes a battery level acquisition unit 152 and an operation control unit 154.

2-2-2. Battery Level Acquisition Unit 152

The battery level acquisition unit 152 is an example of an acquisition unit according to the present disclosure. The battery level acquisition unit 152 acquires a measured value of an amount of charge left in the battery 200 while the battery 200 is installed in the autonomous moving body 10

(more specifically, the main body 106). For example, the battery level acquisition unit 152 may calculate the amount of charge left in the battery 200 on the basis of a measurement result of a terminal voltage of the battery 200 by, for example, the sensor unit 162 described later. Thus, the battery level acquisition unit 152 may acquire a value thus calculated, as the measured value. Alternatively, the battery level acquisition unit 152 may calculate the amount of charge left in the battery 200 on the basis of a measurement result of a current from the battery 200 by, for example, the sensor unit 162. Thus, the battery level acquisition unit 152 may acquire a value thus calculated, as the measured value.

2-2-3. Operation Control Unit 154

2-2-3-1. Movement to Battery Ejection Region 4

The operation control unit 154 controls the operation of the autonomous moving body 10 on the basis of the measured value of the amount of charge left in the battery 200 acquired by the battery level acquisition unit 152. For example, in a case where the measured value of the amount of charge left in the battery 200 acquired by the battery level acquisition unit 152 is brought from a value greater than a predetermined threshold to a value equal to or smaller than the predetermined threshold, the operation control unit 154 controls the moving mechanism 166 described later, to cause a movement from outside the battery ejection region 4 to inside the battery ejection region 4.

For example, at this occasion, the operation control unit 154, first, controls the moving mechanism 166 to cause a movement from outside the battery ejection region 4 to inside the sub-region 8a for power supply connection. Thus, the operation control unit 154 makes a "control to couple the connection terminal 302" as described later. Thereafter, as illustrated in, for example, a right part of FIG. 5, the operation control unit 154 controls the moving mechanism 166 to cause a movement from the sub-region 8a for power supply connection to the sub-region 8b for battery ejection, with the connection terminal 302 coupled. In this way, the autonomous moving body 10 is able to move, with the use of electric power supplied from the power supply apparatus 30, from the sub-region 8a for power supply connection to the sub-region 8b for battery ejection, while dragging the cable 304 in any direction (for example, upward, downward, leftward, and/or rightward). Thereafter, the operation control unit 154 makes a "control to eject the battery 200" as described later. As a modification example, as illustrated in, for example, FIG. 7, the operation control unit 154 may make, in the battery ejection region 4, the "control to couple the connection terminal 302" and the "control to eject the battery 200" at the same time.

Thereafter, as illustrated in, for example, a left part of FIG. 6, the operation control unit 154 may control the moving mechanism 166 to cause a movement from the sub-region 8b for battery ejection to the battery installation region 6, with the connection terminal 302 coupled. In this way, the autonomous moving body 10 is able to move, with the use of electric power supplied from the power supply apparatus 30, from the sub-region 8b for battery ejection to the battery installation region 6, while dragging the cable 304. Thereafter, the operation control unit 154 makes a "control to install the charged battery 500" as described later, and then a "control to remove the connection terminal 302" as described later.

In the following, specific description is given of contents of each of the "control to couple the connection terminal 302", the "control to eject the battery 200", the "control to install the charged battery 500", and the "control to remove the connection terminal 302" as described above.

2-2-3-2. Coupling Control of Connection Terminal

First, the contents of the forgoing "control to couple the connection terminal 302" are described. On the occasion of an arrival of the autonomous moving body 10 at the battery ejection region 4, the operation control unit 154 makes the control to couple the connection terminal 302 included in the power supply apparatus 30 disposed in the battery ejection region 4. For example, as illustrated in FIG. 1, assume that the sub-region 8a for power supply connection is provided in the battery ejection region 4. In this case, on the occasion of the arrival of the autonomous moving body 10 at the sub-region 8a for power supply connection, as illustrated in, for example, FIG. 7, the operation control unit 154 may control the plurality of the legs 110 in the sub-region 8a for power supply connection, to allow the autonomous moving body 10 to bend down to a predetermined height or lower. Thus, the operation control unit 154 may couple the connection terminal 302 to the female connector 104 for power supply.

2-2-3-3. Ejection Control of Battery

Next, the contents of the forgoing "control to eject the battery 200" are described. On the occasion of the arrival of the autonomous moving body 10 at the battery ejection region 4, the operation control unit 154 makes the control to eject the battery 200 in the battery ejection region 4. For example, as illustrated in FIG. 1, assume that the sub-region 8b for battery ejection is provided in the battery ejection region 4. In this case, on the occasion of an arrival of the autonomous moving body 10 at the sub-region 8b for battery ejection, the operation control unit 154 may make the control to eject the battery 200 in the sub-region 8b for battery ejection.

For example, first, the operation control unit 154 may control the plurality of the legs 110 in the sub-region 8b for battery ejection, to allow the autonomous moving body 10 to bend down to the predetermined height or lower. Thus, in a case where the autonomous moving body 10 bends down to the predetermined height or lower, as illustrated in FIG. 7, the operation control unit 154 may rotate the plurality of the rollers 102 for battery attachment and detachment, to eject the battery 200. In this way, it is possible to eject the battery 200 installed in the main body 106, into outside the autonomous moving body 10.

2-2-3-4. Installation Control of Battery

Next, the contents of the forgoing "control to install the charged battery 500" are described. On the occasion of an arrival of the autonomous moving body 10 at the battery installation region 6, the operation control unit 154 makes the control to install the charged battery 500 in the battery installation region 6.

For example, the plurality of the rollers 102 for battery attachment and detachment may be disposed in the main body 106. In this case, as illustrated in FIG. 8, first, the operation control unit 154 may control the plurality of the legs 110 in the battery installation region 6, to allow the autonomous moving body 10 to bend down to the predetermined height or lower. Thus, (in the case where the autonomous moving body 10 bends down to the predetermined height or lower) the operation control unit 154 may rotate the plurality of the rollers 102 for battery attachment and detachment, to install (for example, pull up) one of the charged batteries 500 disposed in the battery installation region 6, in the main body 106. In this way, it is possible to install the battery 500 in the main body 106.

Here, the forgoing contents are described in more details. For example, as illustrated in FIG. 9, the charged battery 500 may include a battery main body 502. Moreover, a connector male part 504 may be attached to an upper part of the battery main body 502. Furthermore, a power cable 132 may be disposed in the main body 106 of the autonomous moving body 10. The power cable 132 is configured to supply electric power to inside the main body 106. A connector female part 130 may be disposed in an outer periphery of the main body 106. Moreover, the power cable 132 and the connector female part 130 may be coupled. In the example illustrated in FIG. 9, the operation control unit 154 may rotate the plurality of the rollers 102 for battery attachment and detachment, to allow the connector male part 504 included in the charged battery 500 to be inserted in, and coupled appropriately to, the connector female part 130.

As a modification example, as illustrated in FIG. 9, a plurality of resilient bodies 134 (sometimes also referred to as a floating mechanism) may be disposed between the connector female part 130 and the main body 106. According to such a configuration, it is possible to absorb an impact on the occasion of insertion of the connector male part 504 into the connector female part 130. Hence, it is possible to protect the connector male part 504 against an impact of the main body 106. Moreover, it is possible to enhance durability of the main body 106.

2-2-3-5. Removal Control of Connection Terminal

Next, the contents of the forgoing "control to remove the connection terminal 302" are described. For example, on the occasion of the installation of the charged battery 500 in the main body 106, the operation control unit 154 may make the control to remove the connection terminal 302 from the main body 106. It is to be noted that on this occasion, as illustrated in FIG. 10, the connection terminal 302 (removed from the main body 106) and the cable 304 may be automatically retracted (for example, rewound) to a predetermined position, toward the main body 300 of the power supply apparatus 30.

2-2-4. Communication Unit 160

The communication unit 160 performs transmission and reception of information to and from an external device (e.g., a general-purpose PC (Personal Computer)) by wired and/or wireless communication, through a predetermined network (e.g., the Internet, a public network, or a LAN (Local Area Network) of various kinds). For example, the communication unit 160 may receive instruction information from an external device. The instruction information is provided for a user giving an instruction as to, for example, a next destination of the autonomous moving body 10 and contents of an operation at a predetermined time zone.

2-2-5. Sensor Unit 162

The sensor unit 162 is configured to make sensing of information regarding external environment of the autonomous moving body 10 and information regarding internal environment of the autonomous moving body 10. The sensor unit 162 includes, for example, a camera (an image sensor), a depth sensor (e.g., a sensor of a time-of-flight method, or a stereo camera), a microphone, an acceleration sensor, a gyroscope, a temperature sensor, a geomagnetic sensor, and/or a torque sensor. Furthermore, the sensor unit 162 may include a receiver that receives a positioning signal from a positioning satellite such as the GPS (Global Positioning System) and the GLONASS (Global Navigation Satellite System).

2-2-6. Storage Unit 164

The storage unit 164 may be configured to include, for example, an HDD (Hard Disk Drive), or a storage device such as a memory, e.g., a RAM and a ROM. The storage unit 164 may hold various kinds of data (e.g., a map information DB and a body information DB) and various kinds of applications. Here, the map information DB may be a database that holds map information of the real world. Moreover, the body information DB may be a database that holds information regarding each part of the autonomous moving body 10 (e.g., a position, a shape, and a size).

2-2-7. Moving Mechanism 166

The moving mechanism 166 is a mechanism for the movement of the autonomous moving body 10. For example, as illustrated in FIG. 2, the moving mechanism 166 may be configured to include the plurality of the legs 110 for walking. Alternatively, the moving mechanism 166 may be configured to include the plurality of the wheels instead of the legs 110, or alternatively, the moving mechanism 166 may be configured to include, for example, the continuous track mechanism such as the caterpillar (registered trademark).

For example, the moving mechanism 166 includes one or more actuators. In this case, driving the one or more actuators on the basis of electric power to be supplied from any one of the battery 200, the battery 500, and the connection terminal 302, and on the basis of a control signal to be supplied from the operation control unit 154 makes it possible for the autonomous moving body 10 to move.

2-3. Flow of Processing

In the forgoing, the functional configuration of the autonomous moving body 10 is described. Next, a flow of processing related to the present embodiment is described with reference to FIG. 11. FIG. 11 is a flowchart illustrating an example of the flow of processing related to the present embodiment. In the following, description is given of an example of a flow of processing while the autonomous moving body 10 is moving toward the predetermined destination.

As illustrated in FIG. 11, until the autonomous moving body 10 arrives at the predetermined destination (S101: No), the controller 150 of the autonomous moving body 10 repeats processes of S103 to S115 described later. It is to be noted that on the occasion of the arrival of the autonomous moving body 10 at the predetermined destination (S101: Yes), the flow of the processing is terminated.

Specifically, first, in S103, the battery level acquisition unit 152 acquires the measured value of the amount of charge left in the battery 200 that is currently installed in the autonomous moving body 10. In a case where the measured value of the amount of charge left is greater than the predetermined threshold (S103: No), the controller 150 repeats again the process of S101 and subsequent processes.

Meanwhile, in a case where the measured value of the amount of charge left becomes equal to or smaller than the predetermined threshold (S103: Yes), the operation control unit 154 controls the moving mechanism 166 to cause the movement from outside the battery station 2 to inside the battery station 2 (more specifically, inside the battery ejection region 4) (S105).

Thereafter, on the occasion of the arrival of the autonomous moving body 10 at the battery ejection region 4, the operation control unit 154 makes the control to couple the connection terminal 302 included in the power supply apparatus 30 disposed in the battery ejection region 4. For example, the operation control unit 154 controls the plurality of the legs 110, to allow the autonomous moving body 10 to bend down to the predetermined height or lower, and thereby couple the connection terminal 302 to the female connector 104 for power supply (S107).

Furthermore, the operation control unit 154 makes the control to eject the battery 200 in the battery ejection region 4. For example, the operation control unit 154 rotates the plurality of the rollers 102 for battery attachment and detachment, to eject the battery 200 into outside the autonomous moving body 10 (S109).

Thereafter, the operation control unit 154 controls the moving mechanism 166, to cause the movement from the battery ejection region 4 to the battery installation region 6, with the connection terminal 302 coupled (S111).

Thereafter, on the occasion of the arrival of the autonomous moving body 10 at the battery installation region 6, the operation control unit 154 makes the control to install one of the charged batteries 500 disposed in the battery installation region 6. For example, the operation control unit 154 controls the plurality of the legs 110, to allow the autonomous moving body 10 to bend down to the predetermined height or lower. Thus, the operation control unit 154 rotates the plurality of the rollers 102 for battery attachment and detachment, to install one of the charged batteries 500 in the main body 106 (S113).

On the occasion of the installation of the charged battery 500 in the main body 106, the operation control unit 154 makes the control to remove the connection terminal 302 from the main body 106 (S115).

Thereafter, the controller 150 repeats again the process of S101 and the subsequent processes.

2-4. Effects

2-4-1. Effect 1

As described above, the autonomous moving body 10 according to the present embodiment couples the connection terminal 302 to the autonomous moving body 10 in the battery ejection region 4. The connection terminal 302 is included in the power supply apparatus 30 disposed in the battery ejection region 4. Thus, the autonomous moving body 10 according to the present embodiment moves from the battery ejection region 4 to the battery installation region 6, with the connection terminal 302 coupled. Hence, it is possible to make the battery replacement easily and efficiently.

For example, it is possible for the autonomous moving body 10 to make the battery replacement without mounting a spare battery. More specifically, for the movement of the autonomous moving body 10 from the battery ejection region 4 to the battery installation region 6, it is sufficient for the autonomous moving body 10 to couple the connection terminal 302. It is unnecessary to use an additional spare battery for driving time involved in the battery replacement.

Furthermore, according to the present embodiment, it is possible for the autonomous moving body 10 to finish charging solely by installing the charged battery 500. This eliminates charging time.

2-4-2. Effect 2

Moreover, according to the present embodiment, it is unnecessary to dispose, in the battery station 2, any driving mechanism for the battery replacement. Hence, it is possible to reduce a size and a weight of the battery station 2.

2-4-3. Effect 3

Moreover, according to the present embodiment, it is possible to distinguish the battery ejection region 4 and the battery installation region 6 in the battery station 2. It is, therefore, sufficient for the autonomous moving body 10 to move inside the battery station 2 for the battery replacement. Hence, it is unnecessary to dispose any battery transfer device inside the battery station 2.

2-4-4. Effect 4

Moreover, the autonomous moving body 10 may include, in the main body 106, the mechanism for assistance with the battery replacement (e.g., the plurality of the rollers 102 for battery attachment and detachment). Hence, it is possible to make precise alignment of the battery and the main body 106. For example, as compared to a case solely with the use of leg driving, it is possible to enhance alignment precision. Moreover, it is possible to make, for example, the coupling of the connection terminal 302 more flexibly (for example, it is possible to extend a range of space that makes it possible to couple the connection terminal 302 appropriately).

3. APPLICATION EXAMPLES

The present embodiment is not limited to the forgoing examples, but various application examples are applicable. Next, application examples of the present embodiment are described in "3-1. Application Example 1" to "3-5. Application Example 5". It is to be noted that each constituent element included in the autonomous moving body 10 according to each of the application examples is similar to that in the example illustrated in FIG. 4. In the following, description is given of solely constituent elements having different functions from those in the forgoing embodiment, and description of the same contents is omitted.

3-1. Application Example 1

First, Application Example 1 according to the present embodiment is described. In the forgoing embodiment, as illustrated in, for example, FIG. 7, description is given of the example where in the battery ejection region 4, the autonomous moving body 10 ejects the used battery 200 at a lower level than that of the main body 106 while the autonomous moving body 10 is walking. Similarly, as illustrated in FIG. 8, description is given of the example where in the battery installation region 6, each of the charged batteries 500 is disposed at a lower level than that of the main body 106 while the autonomous moving body 10 is walking. However, the present embodiment is not limited to these examples, but a configuration as described below may be adopted.

3-1-1. Physical Configuration

3-1-1-1. Configuration Example 1

For example, as illustrated in FIG. 12, in the battery ejection region 4, an ejection box 22 may be disposed at a higher level than that of the main body 106 while the autonomous moving body 10 is walking. The ejection box 22 is provided for the ejection of the used battery 200. Thus, the autonomous moving body 10 may eject the battery 200 into the ejection box 22. Similarly, in the battery installation region 6, each of the charged batteries 500 may be disposed at a higher level than that of the main body 106 while the autonomous moving body 10 is walking. Thus, the autonomous moving body 10 may pull down one of the charged batteries 500, to install the charged battery 500 in the main body 106.

3-1-1-2. Configuration Example 2

Alternatively, the autonomous moving body 10 may be configured to eject the battery 200 in at least one of directions out of frontward, rearward, rightward, and leftward of the autonomous moving body 10. For example, as illustrated in FIG. 13, in the battery ejection region 4, an ejection box 24 may be disposed at substantially the same level as that of the main body 106 while the autonomous moving body 10 is walking. The ejection box 24 includes an ejection mechanism provided for the ejection of the battery 200. In this case, in front of the ejection box 24, the autonomous moving body 10 may eject the battery 200 frontward of the autonomous moving body 10 (to eject the battery 200 into the ejection box 24).

Similarly, the autonomous moving body 10 may be configured to draw the charged battery 500 up, from at least one of the directions out of frontward, rearward, rightward, and leftward of the autonomous moving body 10. For example, in the battery installation region 6, the autonomous moving body 10 may be configured to install the charged battery 500, by drawing one of the charged batteries 500 from frontward, rearward, rightward, or leftward of the autonomous moving body 10.

3-1-2. Effects

According to Application Example 1, there is no limitation on the direction in which the battery 200 is ejected, the direction in which the battery 500 is drawn up, and the direction in which the power supply apparatus 30 (more specifically, the connection terminal 302) is attached. Hence, it is possible to ensure a high degree of freedom with respect to battery arrangement in the autonomous moving body 10 and the coupling of the connection terminal 302.

3-2. Application Example 2

Next, Application Example 2 according to the present embodiment is described. In the forgoing embodiment, as illustrated in, for example, FIG. 2, description is given of the example where the autonomous moving body 10 includes the plurality of the rollers 102 for battery attachment and detachment, and rotates the plurality of the rollers 102 for battery attachment and detachment to eject the used battery 200 and to install the charged battery 500. However, the present embodiment is not limited to such an example, but a configuration as described below may be adopted.

3-2-1. Linear Pin Mechanism 140

For example, as illustrated in FIG. 14, in the main body 106 of the autonomous moving body 10 according to Application Example 2, a linear pin mechanism 140 may be disposed. The linear pin mechanism 140 is provided for the ejection of the used battery 200 and the installation of the charged battery 500. More specifically, as illustrated in FIG. 14, the linear pin mechanism 140 may be configured to include two catching pins and a linear actuator.

3-2-2. Operation Control Unit 154

The operation control unit 154 according to Application Example 2 may control the linear pin mechanism 140 to remove the battery 200, by sliding, in the battery ejection region 4, the two catching pins to allow the two catching pins in contact with the installed battery 200 to become non-contact with the battery 200.

Moreover, the operation control unit 154 may control the linear pin mechanism 140 to install the charged battery 500 in the main body 106 in the battery installation region 6. For example, in the battery installation region 6, first, the operation control unit 154 draws the charged battery 500 up to inside the main body 106. Thus, as illustrated in FIG. 14, the operation control unit 154 controls the linear pin mechanism 140 to install the relevant battery 500, by sliding the two catching pins to bring the two catching pins into contact with the relevant battery 500.

3-3. Application Example 3

Next, Application Example 3 according to the present embodiment is described. In the forgoing embodiment, as illustrated in, for example, FIG. 9, description is given of the example where the connector male part 504 is attached to the upper part of the battery main body 502. However, the present embodiment is not limited to such an example, but a configuration as described below may be adopted.

For example, as illustrated in FIG. 15, a driving mechanism may be disposed in the main body 106. The driving mechanism is provided for insertion of a connector 602 into the battery 200. More specifically, the driving mechanism may be configured to insert the connector 602 into the battery 200 from a perpendicular direction to a direction of the insertion of the battery 200 into the main body 106. As an example, the driving mechanism may include a linear actuator 600, the connector 602, and a rod 604. The rod 604 links the linear actuator 600 and the connector 602. Furthermore, a power cable 606 may be coupled to each of the linear actuator 600 and the connector 602. The power cable 606 is configured to supply electric power to inside the main body 106.

In this case, the operation control unit 154 may control the linear actuator 600, to remove the connector 602 from the battery 200 installed in the main body 106. In this way, the operation control unit 154 may remove the battery 200 from the main body 106. Alternatively, the operation control unit 154 may control the linear actuator 600, to insert the connector 602 into the charged battery 500 that has been already disposed in the main body 106. In this way, the operation control unit 154 may install the relevant battery 500 in the main body 106.

3-4. Application Example 4

Next, Application Example 4 according to the present embodiment is described. For example, as illustrated in FIGS. 16 and 17, a plurality of pins 700 for fixation may be linked to the female connector 104 for power supply. Moreover, on the occasion of the insertion of the connection terminal 302 into the female connector 104 for power supply, as illustrated in FIG. 16, the operation control unit 154 may slide the plurality of the pins 700 for fixation from outside to inside the female connector 104 for power supply, to bring the plurality of the pins 700 for fixation into contact with the female connector 104 for power supply. In this way, the connection terminal 302 is brought to a fixed state. According to such a configuration, the connection terminal 302 is fixed more surely to the female connector 104 for power supply, making it possible to prevent the connection terminal 302 from coming off while the autonomous moving body 10 is moving from the battery ejection region 4 to the battery installation region 6.

Moreover, on the occasion of the installation of the charged battery 500 in the main body 106, as illustrated in FIG. 17, the operation control unit 154 may slide the plurality of the pins 700 for fixation from inside to outside the female connector 104 for power supply, to allow the plurality of the pins 700 for fixation (that are in contact with the female connector 104 for power supply) to become non-contact with the female connector 104 for power supply. Thus, the connection terminal 302 is brought to an open state. At this occasion, as described with reference to FIG. 10, the connection terminal 302 and the cable 304 may be automatically retracted to the predetermined position, toward the main body 300 of the power supply apparatus 30.

3-5. Application Example 5

Next, Application Example 5 according to the present embodiment is described. In the forgoing embodiment, description is given of the example where the rotation of the plurality of the rollers 102 for battery attachment and detachment causes the ejection of the battery 200 into the battery ejection region 4. However, the present embodiment is not limited to such an example, but a configuration as described below may be adopted.

For example, a door may be provided on a floor in the main body 106 of the autonomous moving body 10, and the battery 200 may be disposed on the door. The door is configured to open and close by a control of the operation control unit 154. In this case, on the occasion of the arrival of the autonomous moving body 10 at the battery ejection region 4 (more specifically, the sub-region 8b for battery ejection), the operation control unit 154 controls to open the door, to drop the battery 200 onto the battery ejection region 4.

4. MODIFICATION EXAMPLES

Although some preferred embodiments of the disclosure are described above in detail with reference to the accompanying drawings, the disclosure is by no means limited to such examples. It should be appreciated that various modifications and alterations may be made by persons skilled in the art of the present disclosure without departing the scope of technical ideas as defined by the claims, and that the present disclosure is intended to include such modifications and alterations.

4-1. Modification Example 1

In the forgoing embodiment, description is given of the example where the information processing device according to the present disclosure is the autonomous moving body 10, but the present disclosure is not limited to such an example. The information processing device may be a device different from the autonomous moving body 10. For example, the information processing device may be a server, a general-purpose PC (Personal Computer), a tablet type terminal, a game machine, a mobile phone such as a smartphone, a wearable device such as an HMD (Head Mounted Display) and a smartwatch, an on-vehicle device (e.g., a car navigation device), a robot (e.g., a humanoid robot and a drone), or another autonomous moving body 10.

In this case, the information processing device may control the operation of the autonomous moving body 10 through the predetermined network as described above. For example, the information processing device may couple the connection terminal 302 to the autonomous moving body 10 in the battery ejection region 4. The connection terminal 302 is included in the power supply apparatus 30 disposed in the battery ejection region 4. Thus, the information processing device may move the autonomous moving body 10 from the battery ejection region 4 to the battery installation region 6.

4-2. Modification Example 2

Moreover, the steps in the flow of the processing as described above do not have to be processed in the order described. For example, the steps may be processed in the order appropriately changed. Moreover, the steps may be processed either partially in parallel or separately, instead of being processed in time series. Furthermore, some of the steps described may be omitted, or other steps may be further added.

In addition, according to the forgoing embodiment, a computer program may be provided that allows hardware such as a CPU, a ROM, and a RAM to serve equally as the constituent elements (e.g., the controller 150) of the autonomous moving body 10 according to the forging embodiment. Moreover, a recording medium that holds the relevant computer program is also provided.

Furthermore, the effects described in the present specification are by no means limitative but explanatory or exemplary. That is, the technology according to the present disclosure may produce other effects that are clear to persons skilled in the art from the description of the present specification, together with the forgoing effects, or instead of the forgoing effects.

It is to be noted that the following configurations are also included in the technical scope of the present disclosure.

(1)

An information processing device including a controller that:

couples, in a first region, a connection terminal to an autonomous moving body, the first region being provided for ejection of a first battery included in the autonomous moving body, and the connection terminal being provided for power supply and included in a power supply apparatus disposed in the first region; and moves the autonomous moving body with the connection terminal coupled, from the first region to a second region in which a charged second battery is disposed.

(2)

The information processing device according to (1), in which a main body of the power supply apparatus and the connection terminal are linked by a cable, and the controller moves the autonomous moving body with the connection terminal coupled, from the first region to the second region.

(3)

The information processing device according to (2), in which the controller further allows the autonomous moving body to eject the first battery in the first region.

(4)

The information processing device according to (3), in which the controller further allows the second battery to be installed in the autonomous moving body in the second region, and allows the connection terminal to be removed from the autonomous moving body.

(5)

The information processing device according to (4), further including an acquisition unit that acquires a measured value of an amount of charge left in the first battery, in which the controller moves the autonomous moving body from outside the first region to inside the first region on a condition that the measured value of the amount of charge left in the first battery becomes equal to or smaller than a predetermined threshold.

(6)

The information processing device according to (5), in which the controller couples the connection terminal to the autonomous moving body in the first region, and afterwards, allows the autonomous moving body to eject the first battery in the first region.

(7)

The information processing device according to (5) or (6), in which on a condition that the connection terminal is removed from the autonomous moving body, the connection terminal and the cable are retracted toward the main body of the power supply apparatus.

(8)

The information processing device according to any one of (5) to (7), in which the autonomous moving body includes a plurality of legs, and the controller controls the autonomous moving body in the first region, to allow the autonomous moving body to bend down to a predetermined height or lower, and allows the autonomous moving body to eject the first battery in the first region, with the autonomous moving body bending down to the predetermined height or lower.

(9)

The information processing device according to (8), in which the controller controls the autonomous moving body in the second region, to allow the autonomous moving body to bend down to the predetermined height or lower, and allows the second battery to be installed in the autonomous moving body by drawing the second battery up to the main body of the autonomous moving body in the second region, with the autonomous moving body bending down to the predetermined height or lower.

(10)

The information processing device according to (8) or (9), in which a plurality of rollers is disposed in the main body of the autonomous moving body, the plurality of the rollers being provided for the ejection of the first battery and installation of the second battery, and the controller allows the first battery to be ejected to outside the autonomous moving body, by rotating, in the first region, the plurality of the rollers in contact with the first battery, and allows the second battery to be installed in the main body of the autonomous moving body, by rotating the plurality of the rollers in the second region.

(11)

The information processing device according to (8) or (9), in which a linear pin mechanism is disposed in the main body of the autonomous moving body, the linear pin mechanism being provided for the ejection of the first battery and installation of the second battery, and the controller allows the first battery to be removed from the autonomous moving body, by sliding the linear pin mechanism to allow the linear pin mechanism in contact with the first battery to become non-contact with the first battery in the first region, and allows the second battery to be installed in the main body of the autonomous moving body, by sliding the linear pin mechanism to bring the linear pin mechanism into contact with the second battery in the second region.

(12)

The information processing device according to any one of (5) to (11), in which a power cable is disposed in the main body of the autonomous moving body, and the controller allows the second battery to be installed in the autonomous moving body, by coupling a first connector and a second connector, the first connector being coupled to the power cable, and the second connector being included in the second battery.

(13)

The information processing device according to (12), in which one or more resilient bodies are disposed between the first connector and the main body of the autonomous moving body.

(14)

The information processing device according to any one of (5) to (13), in which the first region and the second region are disposed in a predetermined battery station.

(15)

The information processing device according to (14), in which the first region includes:

a first sub-region provided for the ejection of the first battery; and a second sub-region that is located outside the first sub-region, and in which the power supply apparatus is disposed.

(16)

The information processing device according to (15), in which the controller allows the autonomous moving body to eject the first battery in the first sub-region, and afterwards, allows the second battery to be installed in the autonomous moving body in the second sub-region.

(17)

The information processing device according to any one of (14) to (16), in which the information processing device includes the autonomous moving body.

(18)
An information processing method including:
coupling, in a first region, a connection terminal to an autonomous moving body, the first region being provided for ejection of a first battery included in the autonomous moving body, and the connection terminal being provided for power supply and included in a power supply apparatus disposed in the first region; and
allowing a processor to move the autonomous moving body with the connection terminal coupled, from the first region to a second region in which a charged second battery is disposed.

(19)
A program that causes a computer to implement a controller that:
couples, in a first region, a connection terminal to an autonomous moving body, the first region being provided for ejection of a first battery included in the autonomous moving body, and the connection terminal being provided for power supply and included in a power supply apparatus disposed in the first region; and
moves the autonomous moving body with the connection terminal coupled, from the first region to a second region in which a charged second battery is disposed.

DESCRIPTION OF REFERENCE SIGNS 2 battery station
4 battery ejection region
6 battery installation region
8a sub-region for power supply connection
8b sub-region for battery ejection
10 autonomous moving body
30 power supply apparatus
40, 42, and 44 ejection boxes
102 rollers for battery attachment and detachment
104 female connector for power supply
106 and 300 main bodies
110 legs
120 motor
122 driving power transmission mechanism
130 connector female part
132 and 606 power cables
134 resilient bodies
140 linear pin mechanism
150 controller
152 battery level acquisition unit
154 operation control unit
160 communication unit
162 sensor unit
164 storage unit
166 moving mechanism
200 and 500 batteries
302 connection terminal
304 cable
502 battery main body
504 connector male part
600 linear actuator
602 connector
604 rod
700 pins for fixation

The invention claimed is:

1. An information processing device, comprising a controller configured to:
couple, in a first region, a connection terminal to an autonomous moving body, the first region for ejection of a first battery in the autonomous moving body, and the connection terminal for power supply and in a power supply apparatus, wherein the power supply apparatus is in the first region; and
move the autonomous moving body with the connection terminal coupled, from the first region to a second region that includes a charged second battery.

2. The information processing device according to claim 1, wherein
a main body of the power supply apparatus and the connection terminal are linked by a cable, and
the controller is further configured to move the autonomous moving body with the connection terminal coupled, from the first region to the second region.

3. The information processing device according to claim 2, wherein the controller is further configured to allow the autonomous moving body to eject the first battery in the first region.

4. The information processing device according to claim 3, wherein the controller is further configured to allow the second battery to be installed in the autonomous moving body in the second region, and allow the connection terminal to be removed from the autonomous moving body.

5. The information processing device according to claim 4, further comprising an acquisition unit configured to acquire a measured value of an amount of charge left in the first battery, wherein
the controller is further configured to move the autonomous moving body from outside the first region to inside the first region on a condition that the measured value of the amount of charge left in the first battery becomes equal to or smaller than a specific threshold.

6. The information processing device according to claim 5, wherein the controller is further configured to: couple the connection terminal to the autonomous moving body in the first region, and allow the autonomous moving body to eject the first battery in the first region.

7. The information processing device according to claim 5, wherein on a condition that the connection terminal is removed from the autonomous moving body, the connection terminal and the cable are retracted toward the main body of the power supply apparatus.

8. The information processing device according to claim 5, wherein
the autonomous moving body includes a plurality of legs, and
the controller is further configured to:
control the autonomous moving body in the first region, to allow the autonomous moving body to bend down to a specific height or lower, and
allow the autonomous moving body to eject the first battery in the first region, with the autonomous moving body bending down to the specific height or lower.

9. The information processing device according to claim 8, wherein
the controller is further configured to:
control the autonomous moving body in the second region, to allow the autonomous moving body to bend down to the specific height or lower, and
allow the second battery to be installed in the autonomous moving body by drawing the second battery up to the main body of the autonomous moving body in the second region, with the autonomous moving body bending down to the specific height or lower.

10. The information processing device according to claim 8, further comprises:

a plurality of rollers in the main body of the autonomous moving body, wherein the plurality of the rollers are for the ejection of the first battery and installation of the second battery, and
the controller is further configured to:
allow the first battery to be ejected to outside the autonomous moving body, based on a rotation, in the first region, the plurality of the rollers in contact with the first battery, and
allow the second battery to be installed in the main body of the autonomous moving body, based on the rotation of the plurality of the rollers in the second region.

11. The information processing device according to claim 8, further comprises:
a linear pin mechanism in the main body of the autonomous moving body, the linear pin mechanism is for the ejection of the first battery and installation of the second battery, wherein
the controller is further configured to:
allow the first battery to be removed from the autonomous moving body, by sliding the linear pin mechanism to allow the linear pin mechanism in contact with the first battery to become non-contact with the first battery in the first region, and
allow the second battery to be installed in the main body of the autonomous moving body, by sliding the linear pin mechanism to bring the linear pin mechanism into contact with the second battery in the second region.

12. The information processing device according to claim 5, wherein
a power cable is in the main body of the autonomous moving body, and
the controller is further configured to allow the second battery to be installed in the autonomous moving body, by coupling a first connector and a second connector, the first connector being coupled to the power cable, and the second connector being included in the second battery.

13. The information processing device according to claim 12, wherein at least one resilient body is between the first connector and the main body of the autonomous moving body.

14. The information processing device according to claim 5, wherein the first region and the second region are in a specific battery station.

15. The information processing device according to claim 14, wherein
the first region includes:
a first sub-region for the ejection of the first battery; and
a second sub-region outside the first sub-region, and in which the power supply apparatus is disposed.

16. The information processing device according to claim 15, wherein the controller is further configured to: allow the autonomous moving body to eject the first battery in the first sub-region, and allow the second battery to be installed in the autonomous moving body in the second sub-region.

17. The information processing device according to claim 14, wherein the information processing device comprises the autonomous moving body.

18. An information processing method comprising:
coupling, in a first region, a connection terminal to an autonomous moving body, the first region for ejection of a first battery in the autonomous moving body, and the connection terminal for power supply and in a power supply apparatus, wherein the power supply apparatus is in the first region; and
allowing a processor to move the autonomous moving body with the connection terminal coupled, from the first region to a second region that includes a charged second battery.

19. A non-transitory computer-readable medium having stored thereon, computer-executable instructions which, when executed by a computer, cause the computer to execute operations, the operations comprising:
coupling, in a first region, a connection terminal to an autonomous moving body, the first region for ejection of a first battery in the autonomous moving body, and the connection terminal for power supply and in a power supply apparatus, wherein the power supply apparatus is in the first region; and
allowing a processor to move the autonomous moving body with the connection terminal coupled, from the first region to a second region that includes a charged second battery.

* * * * *